(12) United States Patent
Liu et al.

(10) Patent No.: US 9,816,632 B2
(45) Date of Patent: Nov. 14, 2017

(54) ACTUATED VALVE SYSTEM TRIGGERED BY THE FAILURE OF A COLLAPSIBLE PIN UNDER OVERPRESSURE CONDITION

(71) Applicant: JIANGSU RELIABLE MECHANICAL EQUIPMENT CO., LTD, Nanjing, Jiangsu Province (CN)

(72) Inventors: Hailiang Liu, Nanjing (CN); Tao Mu, Nanjing (CN); Zaixiao Zhang, Nanjing (CN); Lei Wang, Nanjing (CN); Shoujun Zhao, Nanjing (CN)

(73) Assignee: Jiangsu Reliable Mechanical Equipment Co., Ltd., Nanjing (CN)

( * ) Notice: Subject to any disclaimer, the term of this patent is extended or adjusted under 35 U.S.C. 154(b) by 0 days.

(21) Appl. No.: 15/186,751

(22) Filed: Jun. 20, 2016

(65) Prior Publication Data
US 2017/0122448 A1    May 4, 2017

(30) Foreign Application Priority Data
Nov. 2, 2015    (CN) .......................... 2015 1 07360360

(51) Int. Cl.
*F16K 17/40* (2006.01)
*F16K 31/143* (2006.01)
*F16K 31/163* (2006.01)

(52) U.S. Cl.
CPC ............ *F16K 17/40* (2013.01); *F16K 17/406* (2013.01); *F16K 31/143* (2013.01); *F16K 31/1635* (2013.01); *Y10T 137/7722* (2015.04)

(58) Field of Classification Search
CPC . F16K 17/40; F16K 31/1635; Y10T 137/7722

USPC ............................................... 137/70, 624.27
See application file for complete search history.

(56) References Cited

U.S. PATENT DOCUMENTS

| 3,650,506 | A | * | 3/1972 | Bruton | F16K 31/1635 251/26 |
|---|---|---|---|---|---|
| 4,724,857 | A | | 2/1988 | Taylor | |
| 6,367,498 | B1 | | 4/2002 | Brazier | |
| 6,651,686 | B2 | | 11/2003 | Scantlin | |
| 6,651,687 | B2 | | 11/2003 | Taylor | |
| 6,666,230 | B1 | | 12/2003 | Taylor | |
| 7,438,087 | B1 | * | 10/2008 | Taylor | F16K 15/03 137/624.27 |

(Continued)

*Primary Examiner* — Kevin Lee
(74) *Attorney, Agent, or Firm* — Rankin, Hill & Clark LLP

(57) ABSTRACT

An actuated valve system operates (open/close) automatically under overpressure condition. The system includes an on/off valve assembly, a spring actuator assembly configured to actuate the on/off valve assembly to open or close a path for the pressurized fluid, a lock mechanism with one locking yoke and two rotatable locking handles, a collapsible pin type pressure sensing assembly configured to trigger the action of the spring actuator assembly, and a pressure sensing line. The collapsible pin type pressure sensing assembly includes a body, a plunger with two stems, one of which is rigidly connected with the locking yoke, and a collapsible pin, which mechanically fails when the fluid pressure reaches the predetermined level. When the collapsible pin fails, the plunger moves together with the locking yoke, and the locking yoke loses its restriction to the motive element of the spring actuator assembly, and thus trigger the operation of the actuated valve system.

11 Claims, 6 Drawing Sheets

(56) References Cited

U.S. PATENT DOCUMENTS

2011/0259436 A1 10/2011 Fritts

* cited by examiner

ACTUATED VALVE SYSTEM TRIGGERED BY THE FAILURE OF A COLLAPSIBLE PIN UNDER OVERPRESSURE CONDITION

FIELD OF THE INVENTION

The present invention relates generally to pressurized fluid systems and more particularly, but not by way of limitation, to an actuated valve system that can operate (open/close) automatically when the pressure responsive member (collapsible pin) detects the overpressure conditions in a pressurized fluid.

BACKGROUND

Pressurized fluid systems are typically provided with valves that can operate (open/close) under overpressure conditions. In practice, a system including pressure sensor, logic solver and valve with actuator is often used. When the fluid pressure reaches the predetermined level, the sensor will detect the large increase in fluid pressure, and the logic solver will send command to the actuator to open/close the valve after getting the signal from the sensor.

The safety of the pressurized fluid systems protected by pressure sensor, logic solver and valve is threatened when the valve does not open/close as expected, such as when the sensor fails or the transmission of signal between sensor and the logic server fails or the transmission of command between logic server and valve interrupts.

Some other fail-safe valve systems that can also open/close automatically under overpressure condition use a collapsible pin arrangement, such as taught by U.S. Pat. No. 4,724,857 & U.S. Pat. No. 6,666,230 issued to Taylor and U.S. Pat. No. 6,651,686 issued to Scantlin and Cravens. In such systems, the pin is placed under compressive loading along an axial direction of the pin by the pressure of the fluid. A sufficient increase in fluid pressure above a nominal operational level causes the pin to buckle, or collapse, allowing a plunger or other mechanism to move to trigger the operation of the actuated valves.

A valve system can be advantageously configured to open or close in response to the collapse of a collapsible pin. However, system forces can undesirably affect a threshold pressure level at which the pressure responsive member begins to fail. For example, friction forces and fluidic pressure can tend to offset the compressive loading upon a collapsible pin if the pin actuation and the valve are directly coupled.

There is therefore a continued need for improvements in the art to increase the accuracy and repeatability of the protection systems, and it is to such improvements that the present invention is directed.

An actuated valve system is provided to operate (open/close) automatically under overpressure condition. The system includes a spring actuator assembly, an on/off valve assembly, a lock mechanism with one locking yoke and two rotatable locking handles, a collapsible pin type pressure sensing assembly and a pressure sensing line. The function of the pressure sensing line is to connect the upstream of the valve assembly with the body cavity of the collapsible pin type pressure sensing assembly, and in such a way the plunger undertakes the pressure upstream of the valve assembly.

Collapsible pin type pressure sensing assembly is the trigger unit of the whole system, and it mainly includes pin nut, pin cage, collapsible pin, body, and plunger assembly comprised by plunger, stem and locking yoke. The function of the collapsible pin type pressure sensing assembly is designed based on Euler's theory regarding the buckling of slim column subject to compressive force and realized by changing the plunger assembly's working positions.

The plunger of the collapsible pin type pressure sensing assembly bears the force due to the pressure in the upstream pipeline, and the force is transmitted to the collapsible pin by the second plunger stem. When the pressure in upstream pipeline is lower than the predetermined level, the axial force in the collapsible pin is below the threshold buckling value, and thus the collapsible pin is in a stable state, and the plunger assembly is in its first position. In this position, the locking yoke, which is rigidly connected with the first plunger stem, locks the rotatable locking handles, and the rotatable locking handles hold the motive element through the supporting rod of the spring actuator assembly, and the valve assembly is in the usual position.

When the pressure in the upstream pipeline is higher than the predetermined level, the axial force in the collapsible pin is over the threshold buckling value and simultaneously the collapsible pin buckles and loses its load-supporting capability. Due to the loss of the propulsive force from the collapsible pin, the plunger assembly, which is pushed by the pressure inside of the pipeline, moves to its second position. In this process, the locking yoke moves until losing its restriction on the rotatable locking handles, and then the rotatable locking handles releases the supporting rod of spring actuator assembly, and the spring actuator assembly drives the valve assembly to its unusual position, and thus the automatic operation (open/close) of the on/off valve assembly under overpressure condition is realized.

In this application, the collapsible pin type pressure sensing assembly realizes the function of pressure sensor and logic solver, and thus the whole system does not need any sensors and signal transmission, and the design is simple and reliable.

SUMMARY OF THE INVENTION

The present invention comprises a spring actuator assembly, an on/off valve assembly, a lock mechanism with one locking yoke and two rotatable locking handles, a collapsible pin type pressure sensing assembly and a pressure sensing line.

The spring actuator assembly comprises a housing, a supporting rod, a motive element (such as a piston), a motion conversion mechanism and at least one spring. The spring actuator assembly has an unactuated state and an actuated state. In the unactuated state, the spring is in a state of storing potential energy, and the motion of the motive element and motion conversion mechanism is restricted since the supporting rod is held by lock mechanism. When the spring actuator assembly shifts to the actuated state, the spring(s) thrusts the motive element and supporting rod to move linearly, and the motion conversion mechanism changes linear motion into rotary motion, and then the spring actuator assembly drives the coupled on/off valve assembly to a fully-open or fully-closed position.

The function of the pressure sensing line is to connect the upstream pipeline of the on/off valve assembly with the first chamber of body cavity, and in such a way the plunger of the pressure sensing assembly undertakes the pressure in the upstream pipeline of the on/off valve assembly.

The collapsible pin type pressure sensing assembly is the trigger unit of the whole system, and it mainly includes pin nut, pin cage, collapsible pin, body, and plunger assembly comprised by a plunger, a first plunger stem, a second plunger stem and a locking yoke. The function of the collapsible pin type pressure sensing assembly is designed based on Euler's theory regarding the buckling of slim column subject to compressive force and realized by changing the plunger assembly's working positions.

The plunger assembly has a first position and a second position, and the second position of the plunger is longitudinally offset from the first position. Whether the plunger assembly is in the first position or the second position is determined by the collapsible pin. The collapsible pin is installed outside of the body, and its one side is held by the second plunger stem and another side is held by the pin nut. When the collapsible pin buckles, the plunger assembly moves from the first position to the second position.

The plunger of the collapsible pin type pressure sensing assembly bears the force due to the pressure in the upstream pipeline, and the force is transmitted to the collapsible pin by the second plunger stem. When the pressure in upstream pipeline is lower than the predetermined level, the axial force in the collapsible pin is below the threshold buckling value, and thus the collapsible pin is in a stable state, and the propulsive force from the collapsible pin retains the plunger assembly in its first position. In this position, the locking yoke, which is rigidly connected with the first plunger stem, locks the rotatable locking handles, and the rotatable locking handles are not able to rotate and thus hold the supporting rod to restrict it from moving linearly, and then the spring actuator assembly is in the unactuated state and the valve assembly is in the usual position.

When the pressure in the upstream pipeline is greater than the predetermined level, namely when the pressure in the first chamber of body cavity is higher than the predetermined level, the axial force in the collapsible pin is over the threshold buckling value and simultaneously the collapsible pin buckles and loses its load-supporting capability. Due to the loss of the propulsive force from the collapsible pin, the plunger assembly, which is pushed by the pressure inside of the pipeline, moves to its second position. In this process, the locking yoke moves until losing its restriction on the rotatable locking handles, and then the rotatable locking handles rotate and thus release the supporting rod of spring actuator assembly. The spring actuator assembly shifts to the actuated state, and the supporting rod moves linearly due to the thrust force of the spring(s), and the motion conversion mechanism, which is coupled to the stem of the on/off valve assembly, drives the valve to open or close, and thus realize the automatic operation of the valve assembly under overpressure condition.

BRIEF DESCRIPTION OF THE DRAWINGS

The accompanying drawings, which are incorporated in and constitute a part of this specification, illustrate one embodiment of the invention and together with the description, serve to explain the principles of the invention. In the drawings.

DETAILED DESCRIPTION OF THE INVENTION

Reference will now be made in detail to the presently preferred embodiment of the present invention, an example of which is illustrated in the accompanying drawings. Wherever possible, the same reference numbers will be used throughout the drawings to refer to the same or like parts. An exemplary embodiment of an actuated valve system 100 of the present invention is shown in FIG. 1.

Figure 1:
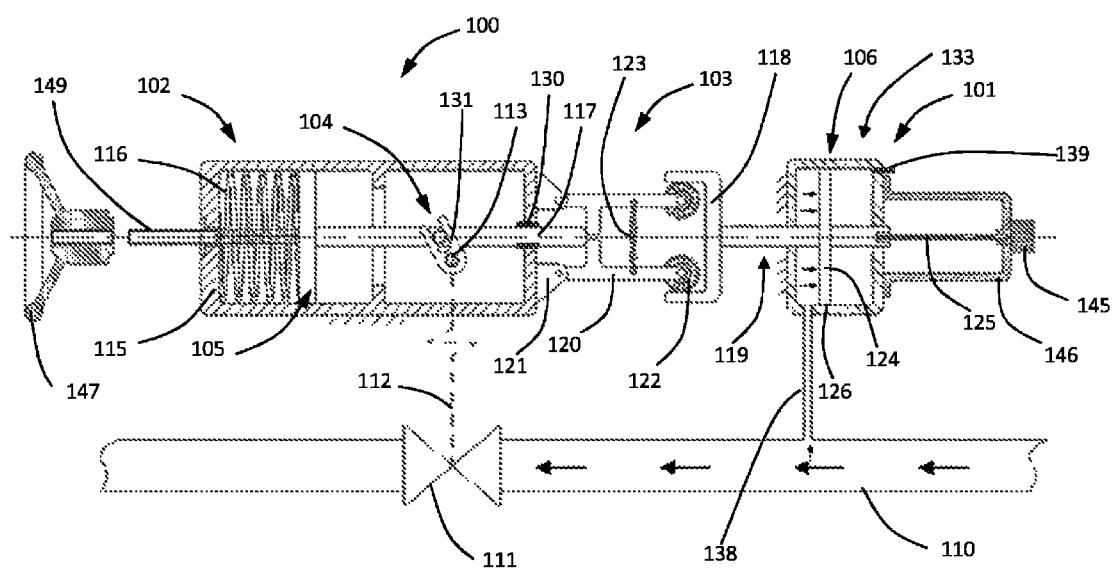
FIG. 1 is a semi-schematic view showing one embodiment of the valve system of the present invention. The spring actuator assembly and the collapsible pin type pressure sensing assembly are shown in cross-section.

With reference to FIG. 1, the present invention comprises a collapsible pin type pressure sensing assembly 101, which is exposed to the pressure in the upstream pipeline 110 of the on/off valve assembly 111. The on/off valve assembly 111 is a rotationally actuated valve, such as a ball valve, butterfly valve, plug valve or other quarter turn valve, and the valve stem 112 of the on/off valve assembly 111 is coupled with the actuator stem 113 of the spring actuator assembly 102.

The present invention further comprises a spring actuator assembly 102 which is adapted for engagement with the on/off valve assembly 111. The spring actuator assembly 102 is characterized by an unactuated state as shown in FIG. 4 and an actuated state as shown in FIG. 5, and is adapted to shift from its unactuated state to its actuated state when the lock mechanism 103 releases its restriction on the supporting rod 117.

The spring actuator assembly 102 may include a motive element 105, such as a piston or other sliding element, which is movable within a housing 115, such as a cylinder, from a first position 126, corresponding to the unactuated state, to a second position 128, which is longitudinally offset from the first position 126 in a second direction 140 and corresponding to the actuated state.

The spring actuator assembly 102 further includes at least one springs 116 in order to apply a directional force to the motive element 105. If unopposed, the motive element 105 will move from its unactuated position to its actuated position due to the directional force from the springs 116. When the spring actuator assembly 102 is in the unactuated state, the springs 116 is in a state of storing potential energy, and the directional force of the springs 116 is overcome by applying a supporting force, which is provided by the lock mechanism 103, against the supporting rod 117 of the motive element 105.

Figure 2:
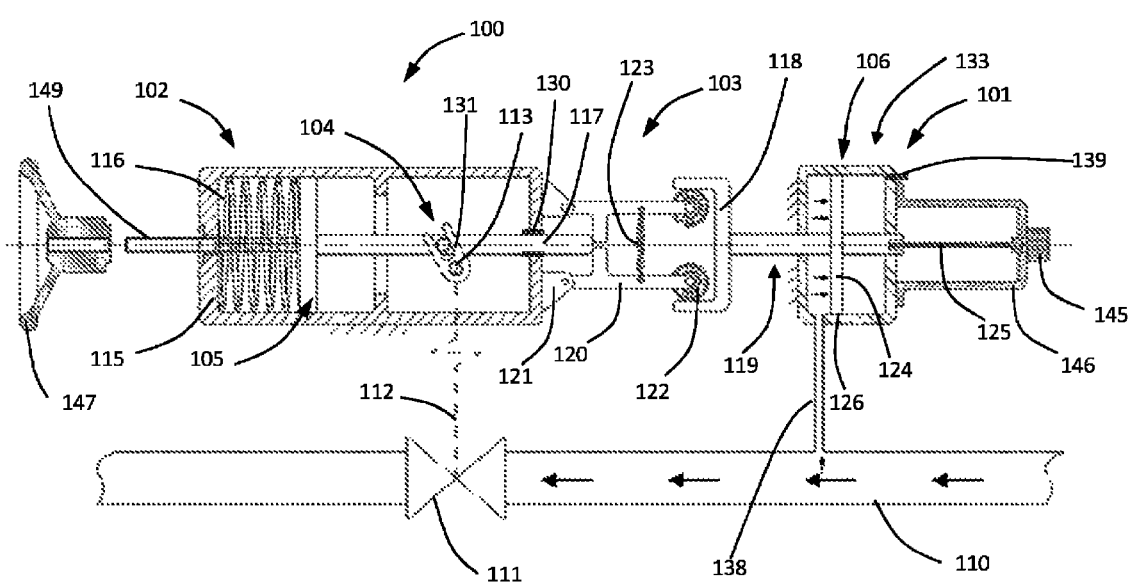
FIG. 2 is a semi-schematic view showing the status of the valve system when the pressure in the upstream pipeline is lower than the predetermined level, with the collapsible pin in stable state and the plunger assembly in its first position and the spring actuator assembly in unactuated state. The spring actuator assembly and the collapsible pin type pressure sensing assembly are shown in cross-section.
Figure 3:
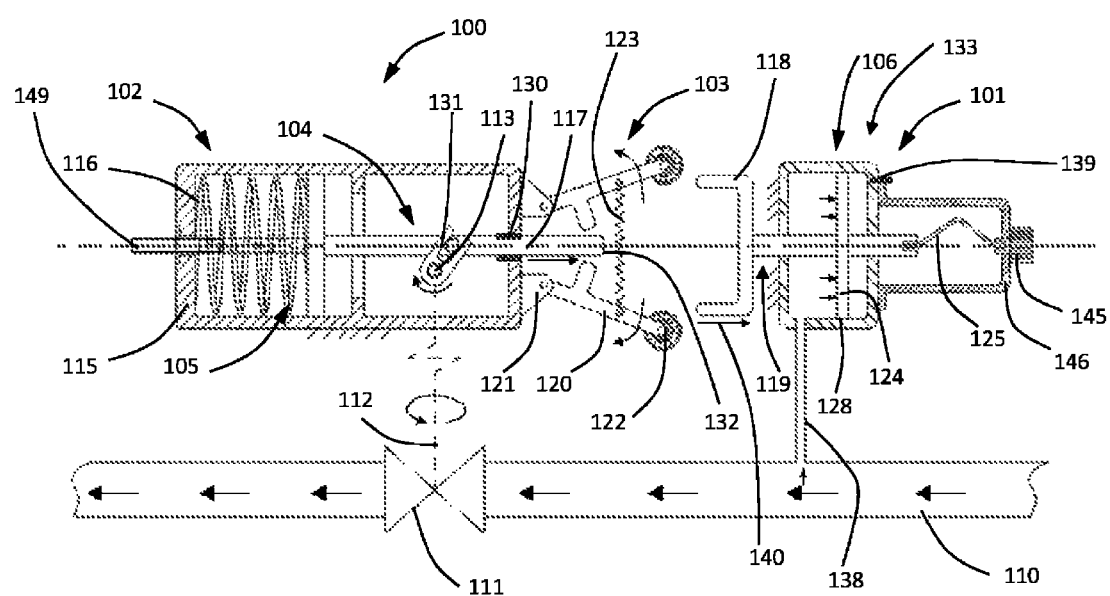
FIG. 3 is a semi-schematic view showing the status of the valve system after the pressure in the upstream pipeline reaches the predetermined level, in which the collapsible pin buckled and the plunger assembly shift to its second position and the spring actuator assembly in actuated state. The spring actuator assembly and the collapsible pin type pressure sensing assembly are shown in cross-section.
Figure 4:
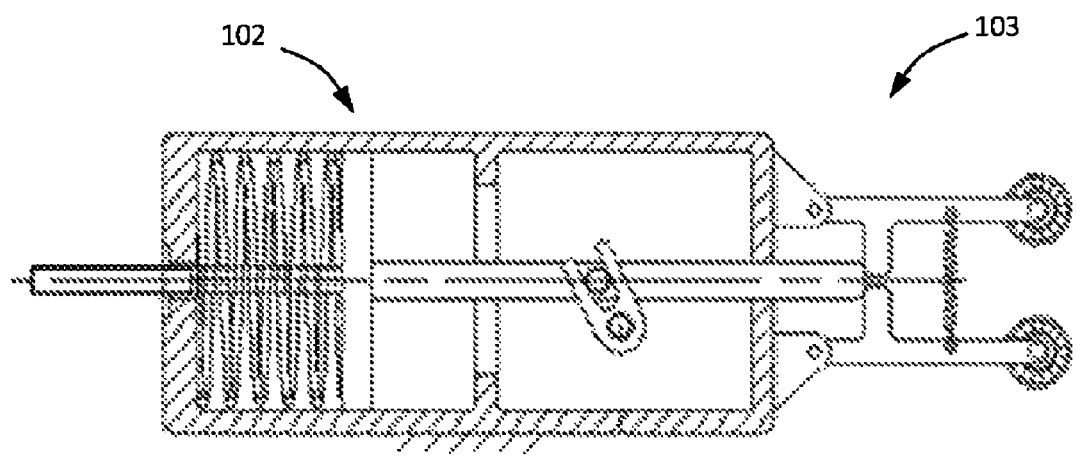
FIG. 4 is a semi-schematic view of spring actuator assembly in unactuated state, and lock mechanism in un-released state.
Figure 5:
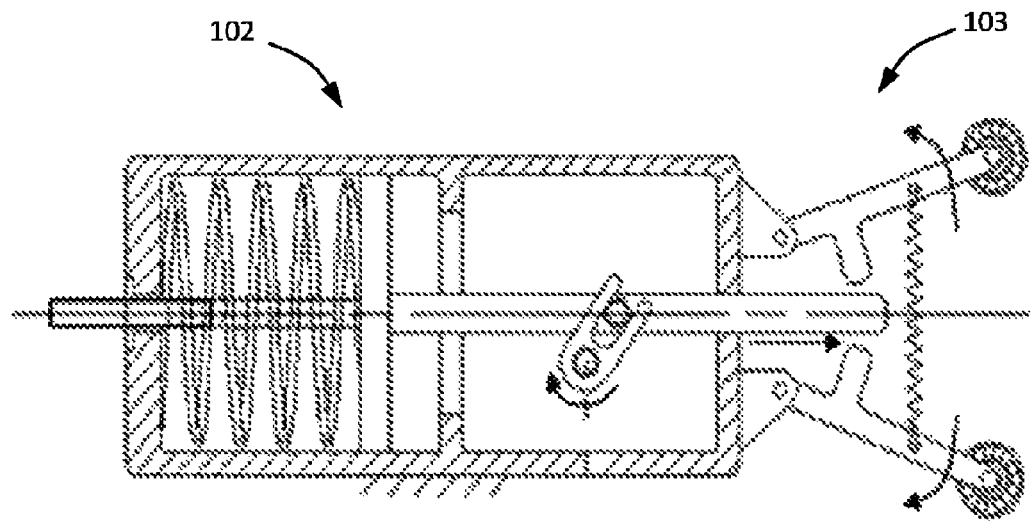
FIG. 5 is a semi-schematic view of spring actuator assembly in actuated state, and lock mechanism in released state.
Figure 6:
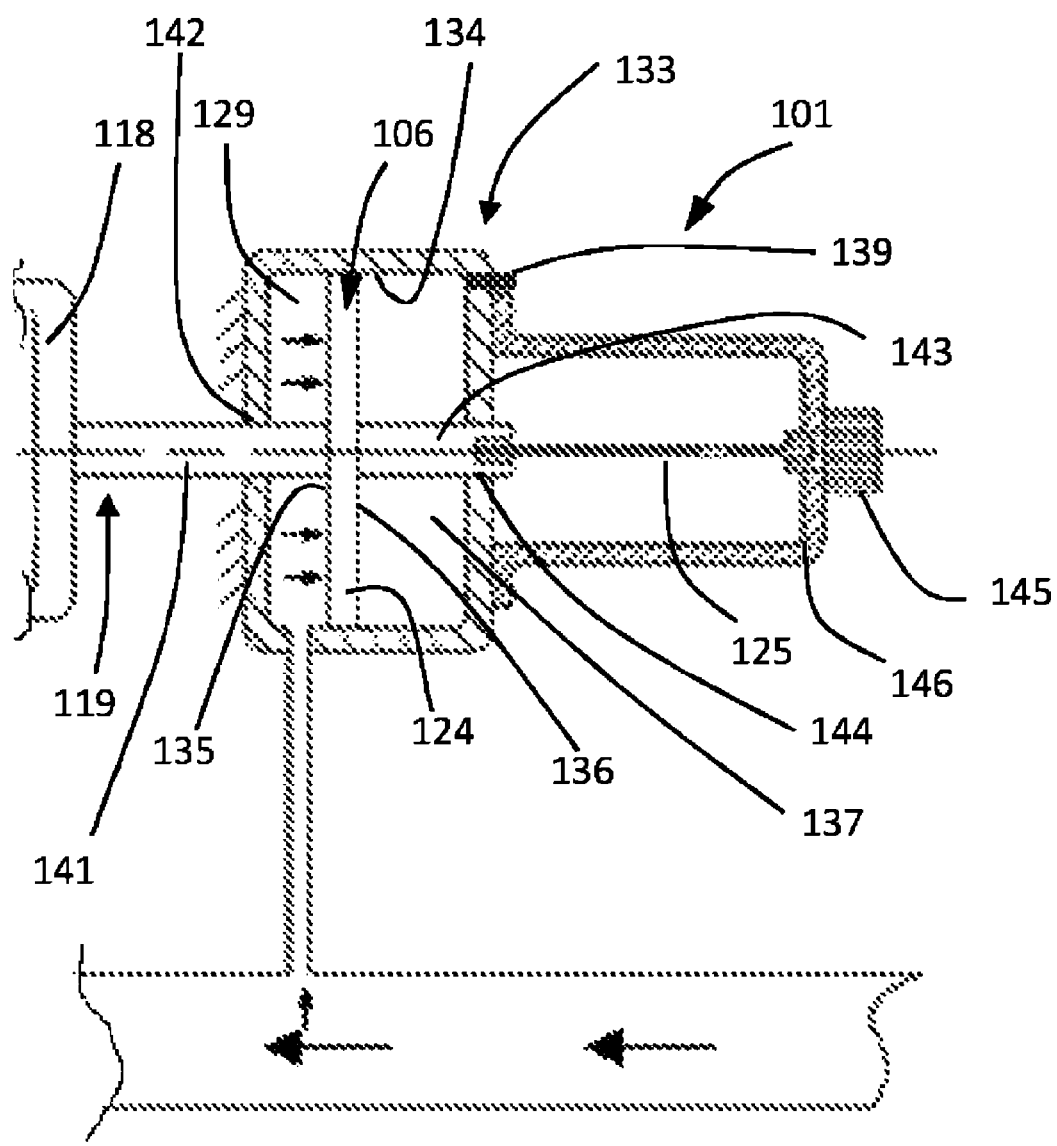
FIG. 6 is a semi-schematic view of collapsible pin type pressure sensing assembly.
Figure 7:
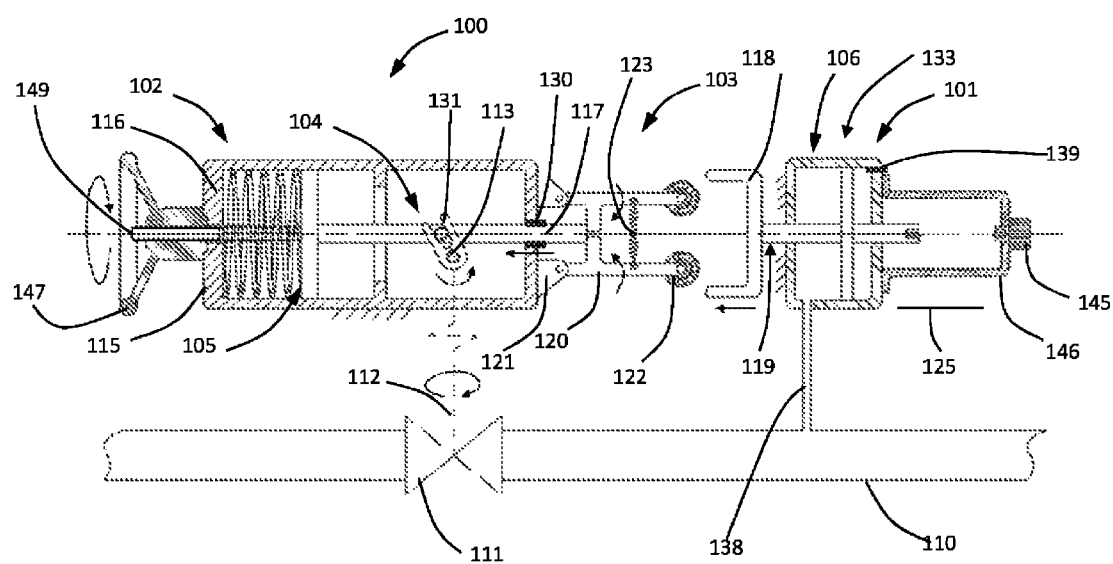
FIG. 7 is a semi-schematic view showing how to reset the valve system after the collapsible pin buckles and the valve assembly operates (open or close) automatically and the pressure inside of the pipeline recovers to its normal value. The spring actuator assembly and the collapsible pin type pressure sensing assembly are shown in cross-section.

As shown in FIGS. 1, 2, 3, 4, 5, 6 and 7, the lock mechanism 103 mainly comprises one locking yoke 118, which is rigidly connected with the stem 119, and two rotatable locking handles 120, which are preferably connected with the housing 115 of spring actuator assembly 102 by hinges 121. The rotatable locking handles 120 are further equipped with friction-reducing devices 122, preferably ball bearings, on the ends to facilitate the relative movement between the rotatable locking handles 120 and the locking yoke 118. One small spring 123 is connected with two rotatable locking handles 120 to provide force that folds two rotatable locking handles 120 in the process of resetting the whole system. The lock mechanism 103 has an unreleased state as shown in FIG. 4, in which the locking yoke 118 prevents the rotation of the rotatable locking handles 120, and a released state as shown in FIG. 5, in which the locking yoke 118 permits such rotation, and the lock mechanism 103 is adapted to shift from its unreleased state to its released state in response to the buckling of the collapsible pin 125.

The plunger 124 of the collapsible pin type pressure sensing assembly 101 bears the force due to the pressure in the upstream pipeline 110, and the force is transmitted to the collapsible pin 125 by the second plunger stem 143, which is connected with the plunger 124. When the pressure in upstream pipeline 110 is lower than the predetermined level, the axial force in the collapsible pin 125 is below the threshold buckling value, and thus the collapsible pin 125 is in a stable state, and the plunger 124 is in its first position 126. In this position, the lock mechanism 103 is in an unreleased state, in such a state the locking yoke 118 prevents the rotation of rotatable locking handles 120, and the rotatable locking handles 120 is not able to rotate and thus hold the supporting rod 117 to restrict it from moving linearly, and then the spring actuator assembly 102 is in the unactuated state and the on/off valve assembly 111 is in the usual position.

When the pressure in the upstream pipeline 110 is greater than the predetermined level, namely when the pressure in the first chamber 129 of body 133 cavity of the collapsible pin type pressure sensing assembly 101 is higher than the predetermined level, the axial force in the collapsible pin 125 is over the threshold buckling value and simultaneously the collapsible pin 125 buckles and loses its load-supporting capability. Due to the loss of the propulsive force from the collapsible pin 125, the plunger 124, which is pushed by the pressure inside of the pipeline, moves to its second position 128. In this process, the locking yoke 118 moves until losing its restriction on the rotatable locking handles 120, and then the lock mechanism 103 shifts to its released state, namely the rotatable locking handles 120 releases the supporting rod 117 of spring actuator assembly 102. The spring actuator assembly 102 shifts to the actuated state, the directional force of the springs 116 moves the motive element 105 and the connected supporting rod 117. The movement of the motive element 105 and supporting rod 117 of the spring actuator assembly 102 is a linear translational movement, whereas the on/off valve assembly 111 is opened or closed by rotational movement of the valve stem 112, and thus the spring actuator assembly 102 further comprises a motion conversion mechanism 104 to change linear motion into rotary motion. The motion conversion mechanism 104 may be a scotch-yoke 131 arrangement, as shown in FIG. 1. The supporting rod 117 supports a cylindrical roller 130 which is engaged by a scotch-yoke 131 as shown. The scotch-yoke 131 is mounted to the actuator stem 113, which in turn is coupled to the valve stem 112. Movement of the supporting rod 117 to the extended position 132 FIG. 3 induces a camming action which rotates the on/off valve assembly 111 to the desired position.

Other similar mechanism for converting the linear translational movement of the motive element 105 to a rotary motion which can open, close or otherwise change the positioning of the on/off valve assembly 111 may also be used.

With reference to FIGS. 1 and 2, the collapsible pin type pressure sensing assembly 101 comprises a body 133, which is characterized by a tubular internal cavity 134 formed therein, also having a longitudinal axis. The internal cavity 134 is also preferably cylindrical in shape, and disposed in coaxial relationship with the body 133.

As shown in FIGS. 1 and 2, the collapsible pin type pressure sensing assembly 101 further comprises a plunger assembly 106. The plunger assembly 106 comprises a plunger 124, positioned within the internal cavity 134 of body 133, and is movable along the longitudinal axis of the internal cavity 134. The plunger 124 is characterized by a first side 135 and an opposed second side 136.

The plunger 124 divides the internal cavity 134 into a first chamber 129 and a second chamber 137, with the first chamber 129 adjacent the first side 135 of the plunger 124, and the second chamber 137 adjacent the second side 136 of the plunger 124. The internal cavity 134 and plunger 124 are provided with seals not shown in order to maintain substantially fluid-tight separation between the opposed first chamber 129 and second chamber 137.

The present invention further comprises a pressure sensing line 138, through which the first chamber 129 is interconnected with the upstream pipeline 110 of the on/off valve assembly 111, and in such a way the plunger 124 undertakes the pressure in the upstream pipeline 110. The second chamber 137 is equipped with vent port 139 to communicate with the atmosphere. As the plunger 124 moves along the longitudinal axis of the internal cavity 134, the volume of one chamber increases, and the volume of its opposed chamber-decreases.

The plunger 124 is characterized by at least a first position 126 and a second position 128, which is longitudinally offset in a second direction 140 from the first position 126. In the embodiment shown in FIG. 6, the second direction 140 is on the right side, and it corresponds to the position of the plunger 124 shown in FIG. 6, in which the volume of the second chamber 137 has been reduced, and the volume of the first chamber 129 has been expanded.

The plunger assembly 106 further comprises a first plunger stem 141 engaged with the first side 135 of the plunger 124 and extending longitudinally through the first chamber 129 and out of the left end of the body 142 and then connecting with locking yoke 118. Seals not shown are provided to maintain a substantially fluid tightness between the first plunger stem 141 and the left end of the body 142 through which it passes.

The plunger assembly 106 further comprises a second plunger stem 143 engaged with the second side 136 of the plunger 124 and extending longitudinally through the second chamber 137 and out of the right end of the body 144.

As shown in FIGS. 1 and 2, the collapsible pin type pressure sensing assembly 101 further comprises a pressure responsive member, which is coupled to the plunger assembly 106 and disposed to oppose longitudinal movement of the plunger 124 in the second direction 140, and configured to mechanically fail in response to the application of a selected force. The pressure responsive member is preferably characterized as a collapsible pin 125, although other members can be used such as a shear pin. The second plunger stem 143 engages one end of the collapsible pin 125, thereby coupling the plunger 124 to the collapsible pin 125. A pin nut 145 of a cage 146, holds the another end of the collapsible pin 125.

As shown in FIGS. 1 and 2, the plunger 124 bears the force due to the pressure in the upstream pipeline 110, and the force is transmitted to the collapsible pin 125 by the second plunger stem 143. When the pressure in upstream pipeline 110 is lower than the predetermined level, the axial force in the collapsible pin 125 is below the threshold buckling value, and thus the collapsible pin 125 is in a stable state, and the propulsive force from the collapsible pin 125 retains the plunger assembly 106 in its first position 126. In this position, the lock mechanism 103 is in the unreleased state, in such a state the locking yoke 118, which is rigidly connected with the first plunger stem 141 prevents the rotation of the rotatable locking handles 120, and thus retain the supporting rod 117 to restrict it from moving linearly, and then the spring actuator assembly 102 is in the unactuated state and the on/off valve assembly 111 is in the usual position.

As presented in FIG. 3, at such point that the pressure of the system fluid rises above the predetermined level, namely when the pressure in the first chamber 129 is higher than the predetermined level, the axial force exerted upon the collapsible pin 125 via the plunger 124 and the second plunger stem 143 exceeds the threshold buckling value and the collapsible pin 125 starts to buckle, and the thrust force exerted on the plunger assembly 106 drops off rapidly. Due to the rapid decrease of the propulsive force from the collapsible pin 125, the plunger assembly 106, which is pushed by the pressure inside of the pipeline, moves to its second position 128. In this process, the locking yoke 118 moves until losing its restriction on the rotatable locking handles 120, and then the lock mechanism 103 shifts to its released state, namely the rotatable locking handles 120 release the supporting rod 117 of spring actuator assembly 102. The spring actuator assembly 102 shifts to the actuated state, the supporting rod 117 moves linearly due to the thrust force of the springs 116, and the motion conversion mechanism 104, which is coupled to the valve stem 112, drives the on/off valve assembly 111 to open or close, and thus the automatic operation of the on/off valve assembly 111 under overpressure condition is realized.

After the pressure inside of the pipeline recovers to its normal value, the system may be reset. This is accomplished by returning the motive element 105 to its original position, and thus let the on/off valve assembly 111 recover to its initial status. It is contemplated that the returning the motive element 105 of the spring actuator assembly 102 of the present invention may include an appropriate mechanism, such as screw-nut arrangement with a handwheel 147 and a resetting rod 149, as presented in FIG. 7, or worm-gear arrangement with handwheel 147, etc.

When the motive element 105 returns to its original position, namely when the on/off valve assembly 111 recovers to its initial status, there is no thrust force from the supporting rod 117 acts on the rotatable locking handles 120, and these two rotatable locking handles 120 fold up under the acting force of the small spring 123.

After the rotatable locking handles 120 return to their original position, the plunger assembly 106 can be reset by pushing the second plunger stem 143, and then a new collapsible pin 125 can be replaced.

In general, on/off valve assembly 111 such as shown in FIG. 1 are not frictionless systems. In order to move the on/off valve assembly 111 between the open position and the closed position, significant amounts of force may be required to overcome reactive forces, such as stiction force i.e., force resisting initial movement of the valve and function force i.e., force resisting continued movement of the valve after the initial movement. One source of these reactive forces is the seal assemblies used to maintain an adequate seal against the fluid pressure about the valve.

Another source of reactive forces is the pressure of the fluid upon the various surfaces of the valve as the valve is rotated. The valve variably restricts a flow stream of the fluid. The pressure of the fluid varies as the on/off valve assembly 111 is placed at intermediate positions between the open and closed positions, and this can impart significant resistance to the rotation of the valve. Thus, making the collapsible pin type pressure sensing assembly 101 initially independent from the spring actuator assembly 102 advantageously prevents the stiction and friction forces of the on/off valve assembly 111 from affecting the operation of the collapsible pin type pressure sensing assembly 101.

It will now be seen that an advantage of the present invention as embodied herein is the isolation of system forces relating to the activation of the on/off valve assembly 111 from the compressive forces acting upon the collapsible pin 125.

Although various embodiments have been presented herein, it will be understood that numerous changes and modifications are readily contemplated and not listed herein for brevity. For example, it will be understood that any number of different mechanical linkages can be used within the actuator assembly to activate the valve assembly. Moreover, although a rotary activation has been described, such is not necessarily limiting to the scope of the appended claims.

Other pressure responsive members such as a shear pin can readily be used in place of the buckling pin disclosed herein. The use of ball bearings to facilitate the relative movement of the locking yoke 118 and rotatable locking handles 120 is preferred, but other configurations such as rollers or bushings can also be employed.

For purposes of the appended claims, mechanical failure will be understood as describing, for example, the buckling of a collapsible pin 125 such as, the shearing of a shear pin. Other shaft-stem coupling arrangements besides a scotch-yoke 131 arrangement to generate a torque are readily contemplated and are well within the ability of those skilled in the art to implement, such as configurations using rack-pinion arrangement, belts, chain drives, or linkages.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. An actuated valve system triggered by failure of a collapsible pin under overpressure condition, comprising:
   an on/off valve assembly, which is a rotationally actuated valve;
   a spring actuator assembly, which is adapted for engagement with the on/off valve assembly, the spring actuator assembly comprising a motive element, which is movable within a housing from a first position, corresponding to an unactuated state of the spring actuator assembly, to a second position, which is longitudinally offset from the first position in a second direction and corresponding to an actuated state of the spring actuator assembly;

a collapsible pin pressure sensing assembly having a pressure responsive member configured to mechanically fail in response to an application of a predetermined force;

a pressure sensing line interconnecting a first chamber of the collapsible pin pressure sensing assembly with an upstream pipeline of the on/off valve assembly;

a lock mechanism comprising a locking yoke, which is rigidly connected with a first plunger stem of the collapsible pin pressure sensing assembly, and two rotatable locking handles, which are connected with the housing of the spring actuator assembly by hinges, the lock mechanism having an unreleased state, in which the locking yoke prevents rotation of the rotatable locking handles, and a released state, in which the locking yoke permits such rotation, wherein the lock mechanism being adapted to shift from its unreleased state to its released state in response to buckling of the collapsible pin.

2. The system of claim 1, wherein the collapsible pin pressure sensing assembly further comprises a plunger, which bears a force due to the pressure in the upstream pipeline, and the force is transmitted to the collapsible pin by a second plunger stem, which is connected with the plunger, and the plunger moves between a first position and a second position, which is longitudinally offset in a second direction from the first position.

3. The system of claim 1, wherein the pressure responsive member comprises the collapsible pin, which is coupled to a plunger assembly and disposed to oppose longitudinal movement of the plunger in the second direction, when the pressure in the upstream pipeline is lower than a predetermined level, an axial force in the collapsible pin is below a threshold buckling value, and thus the collapsible pin is in a stable state, and a propulsive force from the collapsible pin retains the plunger assembly in its first position, and the lock mechanism is in the unreleased state, and the locking yoke prevents rotation of the rotatable locking handles, and thus retains a supporting rod to restrict the supporting rod from moving linearly, and then the spring actuator assembly is in the unactuated state and the on/off valve assembly is in a usual position; when the pressure of the system fluid rises above the predetermined level, the axial force exerted upon the collapsible pin via the plunger and the second plunger stem exceeds the threshold buckling value and the collapsible pin buckles, and the plunger assembly moves to its second position, and the locking yoke moves until losing its restriction on the handles, and then the rotatable locking handles releases the supporting rod of the spring actuator assembly, and the spring actuator assembly shifts to the actuated state, and the supporting rod moves linearly due to a thrust force of a spring, and a motion conversion mechanism, which is coupled to a valve stem, drives the on/off valve assembly to open or close.

4. The system of claim 1, wherein the spring actuator assembly further comprises at least one spring in order to apply a directional force to the motive element, when the spring actuator assembly is in the unactuated state, the spring is in a state of storing potential energy, and the directional force of the spring is overcome by applying a supporting force, which is provided by the lock mechanism, against the supporting rod of the motive element.

5. The system of claim 1, wherein the rotatable locking handles are further equipped with ball bearings on ends to facilitate relative movement between the rotatable locking handles and the locking yoke.

6. The system of claim 1, wherein the collapsible pin pressure sensing assembly comprises a body having a tubular internal cavity formed therein, also having a longitudinal axis.

7. The system of claim 1, wherein the collapsible pin pressure sensing assembly further comprises a plunger assembly, which comprises a plunger, positioned within an internal cavity of a body, and movable along a longitudinal axis of the internal cavity, and the internal cavity and the plunger are provided with seals in order to maintain substantially fluid-tight separation between the first chamber and second chamber.

8. The system of claim 1, further comprising a plunger assembly comprising a first plunger stem engaged with a first side of the plunger and extending longitudinally through the first chamber and out of a left end of a body and then connecting with the locking yoke, and seals are provided to maintain a substantially fluid tightness between the first plunger stem and the left end of the body through which the first plunger stem passes.

9. The system of claim 1, further comprising a plunger assembly comprising a second plunger stem engaged with a second side of the plunger and extending longitudinally through a second chamber and out of a right end of the body.

10. The system of claim 1, wherein the spring actuator assembly further comprises a motion conversion mechanism mounted to an actuator stem, which in turn is coupled to a valve stem, wherein motion of the motive element in the spring actuator assembly is changed into rotary motion of the valve stem, and wherein rotation of the valve stem results in movement of the on/off valve assembly from an open position to a closed position or from the closed position to the open position.

11. The system of claim 1, wherein a second chamber is equipped a vent port to communicate with the atmosphere when a volume of the second chamber changes.

* * * * *